United States Patent
Zuo et al.

(10) Patent No.: US 8,477,610 B2
(45) Date of Patent: Jul. 2, 2013

(54) APPLYING POLICIES TO SCHEDULE NETWORK BANDWIDTH AMONG VIRTUAL MACHINES

(75) Inventors: Yue Zuo, Redmond, WA (US); HoYuen Chau, Redmond, WA (US); Hoi Huu Vo, Bellevue, WA (US); Samer N. Arafeh, Sammamish, WA (US); Vivek P. Divakara, Bothell, WA (US); Yimin Deng, Sammamish, WA (US); Forrest Curtis Foltz, Redmond, WA (US); Vivek Bhanu, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 284 days.

(21) Appl. No.: 12/790,981

(22) Filed: May 31, 2010

(65) Prior Publication Data

US 2011/0292792 A1    Dec. 1, 2011

(51) Int. Cl.
*G08C 15/00* (2006.01)
*H04L 12/56* (2006.01)
*G06F 15/16* (2006.01)

(52) U.S. Cl.
USPC .................. 370/230; 370/395.4; 709/229

(58) Field of Classification Search
USPC .............. 370/230, 235, 235.1, 237, 254–255, 370/395.4; 709/201, 225, 226, 248
See application file for complete search history.

(56) References Cited

U.S. PATENT DOCUMENTS

| 6,985,951 | B2 * | 1/2006 | Kubala et al. ................. 709/226 |
| 7,111,303 | B2 * | 9/2006 | Macchiano et al. ........... 719/313 |
| 7,163,132 | B2 * | 1/2007 | Rundberg ..................... 224/637 |
| 7,272,831 | B2 * | 9/2007 | Cota-Robles et al. ............. 718/1 |
| 7,287,186 | B2 * | 10/2007 | McCrory et al. ................. 714/13 |
| 7,346,909 | B1 * | 3/2008 | Eldar et al. ..................... 719/312 |
| 7,478,173 | B1 * | 1/2009 | Delco ............................ 709/250 |
| 7,515,589 | B2 * | 4/2009 | Bacher et al. .................. 370/392 |
| 7,613,132 | B2 | 11/2009 | Tripathi |
| 7,711,789 | B1 | 5/2010 | Jnagal |
| 7,742,474 | B2 * | 6/2010 | Droux et al. ................... 370/389 |
| 7,782,870 | B1 * | 8/2010 | Tripathi et al. .......... 370/395.42 |
| 7,992,149 | B2 * | 8/2011 | Carollo et al. ................. 718/102 |
| 8,060,875 | B1 * | 11/2011 | Lambeth ........................... 718/1 |

(Continued)

OTHER PUBLICATIONS

The Role of 10 Gigabit Ethernet in Virtualized Environments—Published Date: Feb. 14, 2009 http://www.cisco.com/en/US/prod/collateral/switches/ps9441/ps9670/white_paper_c11-496511.pdf.

(Continued)

*Primary Examiner* — Warner Wong
(74) *Attorney, Agent, or Firm* — Shook Hardy & Bacon LLP (57) ABSTRACT

Computerized methods, systems, and computer-storage media for allowing virtual machines (VMs) residing on a common physical node to fairly share network bandwidth are provided. Restrictions on resource consumption are implemented to ameliorate stressing the network bandwidth or adversely affecting the quality of service (QoS) guaranteed to tenants of the physical node. The restrictions involves providing a scheduler that dynamically controls networking bandwidth allocated to each of the VMs as a function of QoS policies. These QoS policies are enforced by controlling a volume of traffic being sent from the VMs. Controlling traffic includes depositing tokens into token-bucket queues assigned to the VMs, respectively. The tokens are consumed as packets pass through the token-bucket queues. Upon consumption, packets are held until sufficient tokens are reloaded to the token-bucket queues.

14 Claims, 9 Drawing Sheets

U.S. PATENT DOCUMENTS

| | | | |
|---|---|---|---|
| 8,201,190 B2* | 6/2012 | Billau et al. .................. 719/324 |
| 8,205,207 B2* | 6/2012 | Villarreal et al. ............. 718/104 |
| 8,223,770 B2* | 7/2012 | Wray et al. ................... 370/392 |
| 2002/0101820 A1 | 8/2002 | Gupta et al. |
| 2002/0129127 A1* | 9/2002 | Romero et al. ............... 709/220 |
| 2003/0018927 A1* | 1/2003 | Gadir et al. ....................... 714/4 |
| 2003/0037178 A1* | 2/2003 | Vessey et al. ................. 709/319 |
| 2003/0231648 A1 | 12/2003 | Tang |
| 2004/0068558 A1 | 4/2004 | De Miguel |
| 2005/0039180 A1* | 2/2005 | Fultheim et al. ................... 718/1 |
| 2005/0182853 A1* | 8/2005 | Lewites et al. ................ 709/238 |
| 2006/0168214 A1* | 7/2006 | Armstrong et al. ........... 709/225 |
| 2007/0044108 A1 | 2/2007 | Panesar |
| 2008/0008095 A1* | 1/2008 | Gilfix ............................ 370/235 |
| 2009/0116381 A1 | 5/2009 | Kanda |
| 2009/0238072 A1* | 9/2009 | Tripathi et al. ............... 370/235 |
| 2010/0054129 A1 | 3/2010 | Kuik |
| 2010/0064293 A1* | 3/2010 | Kang et al. .................... 718/104 |
| 2010/0153945 A1* | 6/2010 | Bansal et al. ....................... 718/1 |
| 2010/0191845 A1* | 7/2010 | Ginzton ......................... 709/224 |
| 2011/0231696 A1* | 9/2011 | Ji et al. ............................... 714/3 |
| 2011/0235508 A1* | 9/2011 | Goel et al. ..................... 370/230 |

OTHER PUBLICATIONS

VMware ESX 2.5 man pagina's—Published Date: Dec. 10, 2007 http://www.vmug.nl/modules.php?  name=Content&pa=showpage &pid=2.

Cisco MDS 9000 Family SANs Increase Cisco Unified Computing System Benefits—Retrieved Date: Apr. 5, 2010 http://www.cisco.com/en/US/prod/collateral/ps4159/ps6409/ps5990/white_paper_c11-584882.html.

Improve Network Throughput by 30 Percent with the Cisco UCS M81KR Virtual Interface Card—Retrieved Date: Apr. 5, 2010 http://www.cisco.com/en/US/solutions/collateral/ns340/ns517/ns224/ns944/white_paper_c11-593280.pdf.

PCT International Serach Report in PCT/US2011/036127 dated Jan. 2, 2012, 3 pages.

\* cited by examiner

APPLYING POLICIES TO SCHEDULE NETWORK BANDWIDTH AMONG VIRTUAL MACHINES

BACKGROUND

Large-scale networked systems are commonplace platforms employed in a variety of settings for running applications and maintaining data for business and operational functions. For instance, a data center (e.g., physical cloud computing infrastructure) may provide a variety of services (e.g., web applications, email services, search engine services, etc.) for a plurality of customers simultaneously. These large-scale networked systems typically include a large number of resources distributed throughout the data center, in which each resource resembles a physical machine or a virtual machine (VM) running on a physical node or host. When the data center hosts multiple tenants (e.g., customer programs), these resources are optimally allocated from the same data center to the different tenants.

Often, multiple VMs will concurrently run on the same physical node within a computing network, or the data center. These VMs that share a common physical node may be allocated to the different tenants and may require different amounts of resources at a various times. For instance, there is typically only one network card installed to a physical node, where the network card has a limited amount of network bandwidth. When one tenant requires a high amount of resources to accomplish a particular task, one of the tenant's VMs running on the physical node can potentially stress the network card by sending a large amount of packets thereover, preventing other VMs running on the physical node from fairly sharing the resources thereof.

Accordingly, because optimal allocation of processing capabilities within a data center often involves placing a plurality of VMs on a single physical node, and because these VMs require resources (e.g., network bandwidth) to carry out most operations, a mechanism that allows the VMs on the same physical node to share the network bandwidth fairly, by placing restrictions on resource consumption, would help reduce stressing available resources and would help maintain a high quality of service provided to the tenants of the data center.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention provide a mechanism that allows the virtual machines (VMs) residing on a common physical node to fairly share the resources (e.g., network bandwidth) provided by the physical node. Typically, fairly sharing resources involves placing restrictions on resource consumption to ameliorate stressing the network bandwidth or adversely affecting the quality of service that is guaranteed to tenants of the data center in which the VMs reside.

In an exemplary embodiment, the placement of restrictions may involve providing a management utility (e.g., scheduler 401 of FIGS. 5-7) that dynamically controls VM experiences by allocating the networking bandwidth to each of the VMs on a shared physical machine as a function of a policy. In other words, the management utility may grant a physical machine owner, or a tenant of the data center, the ability to configure the policies that control the VMs usage of network bandwidth. Beyond serving as an interface that accepts policies being dictated by one or more entities, the management utility may enforce these policies so that the VMs are provided with a certain quality of service (e.g., a minimum/maximum network bandwidth guaranteed for each VM).

In one instance of enforcing these policies, the management utility may employ rate limiting techniques that are used to control a volume of traffic being sent from the VMs. By way of example, one rate limiting technique may instruct that data packets be freely conveyed from a VM to a network when a rate of data flow from the VM is consuming less resources than currently allocated to the VM. Generally, the allocated resources are specified by the policies associated with the VM. Another rate limiting technique may instruct that data packets be dropped or delayed when the VM is attempting to utilize more resources than currently allocated thereto.

As more fully described below, a set of token-bucket queues and a scheduler may be implemented on the physical node to carry out these rate limiting techniques. Carrying out the rate limiting techniques may initially involve the scheduler inspecting one or more quality of service (QoS) policies written to a contract, where the contract governs allocation of network resources to a client or tenant of a data center. Next, the scheduler may deposit tokens into a token-bucket queue based, in part, on the QoS policies of the client contract. As described herein, the token-bucket queue is assigned to a VM instantiated on the physical node that is shared by other VMs.

The scheduler may then inspect the token-bucket queue to ascertain a state of the VM. For instance, when the deposited tokens are not depleted from the token-bucket queue, the schedule may detect that the VM is in an idle state. In contrast, the scheduler may detect that the VM is in an active state based on a depletion of the deposited tokens from the token-bucket queue, as portion of the deposited tokens are withdrawn from the token-bucket queue as a function of a rate of the data flow from the VM. In this instance, the scheduler may reload tokens into the token-bucket queue based on the QoS policies and on a portion of the deposited tokens remaining in the token-bucket queue. As such, the allocation of network bandwidth using the scheduler in conjunction with the token-bucket queues maintain fairness amongst the VMs while maximizing throughput on the physical node.

BRIEF DESCRIPTION OF THE DRAWINGS

Embodiments of the present invention are described in detail below with reference to the attached drawing figures, wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods, computer systems, and computer-readable media for applying a throttle to a source (e.g., virtual machines (VMs) instantiated on a physical node) of packets, as opposed to controlling traffic at network edges. The applied throttle may, in operation, meter data flows from the VMs according to contracts associated with each. In an exemplary embodiment, metering involves delaying delivery of those packets that exceed one or more policies articulated by the contracts. By way of example, metering may be implemented by token-bucket queues that temporarily store, or "enqueue," the delayed packets. Typically, the token-bucket queues act as first-in first-out (FIFO) buffers that hold the delayed packets until network bandwidth is allocated to the VMs that originated the delayed packets. Upon allocation of sufficient network bandwidth, the token-bucket queues are designed to release the delayed packets to be delivered to their intended destination.

Figure 4:
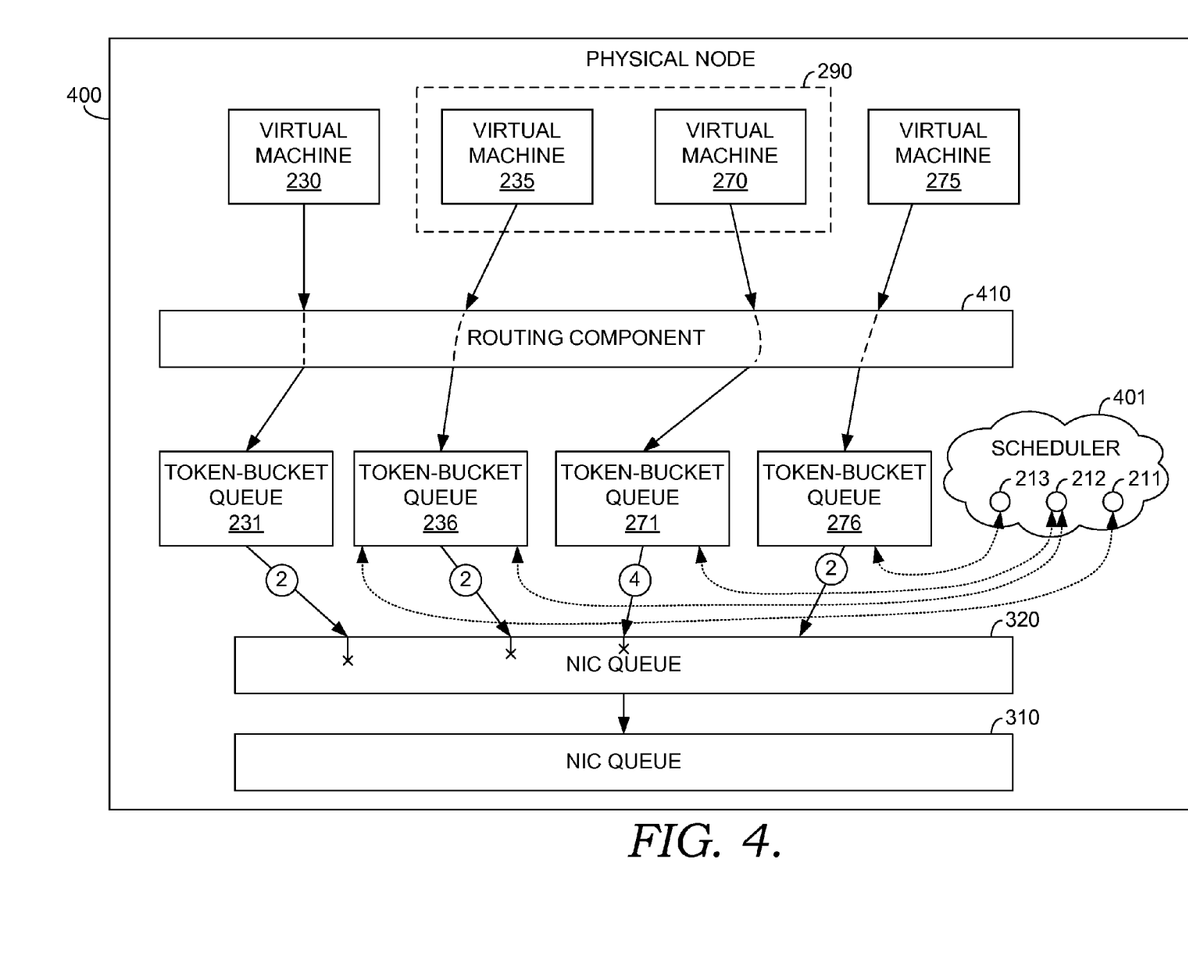
FIGS. 4-6 are block diagrams depicting various data flows between virtual machines (VMs) and corresponding token-bucket queues residing on a single physical node, in accordance with an embodiment of the present invention.
Figure 5:
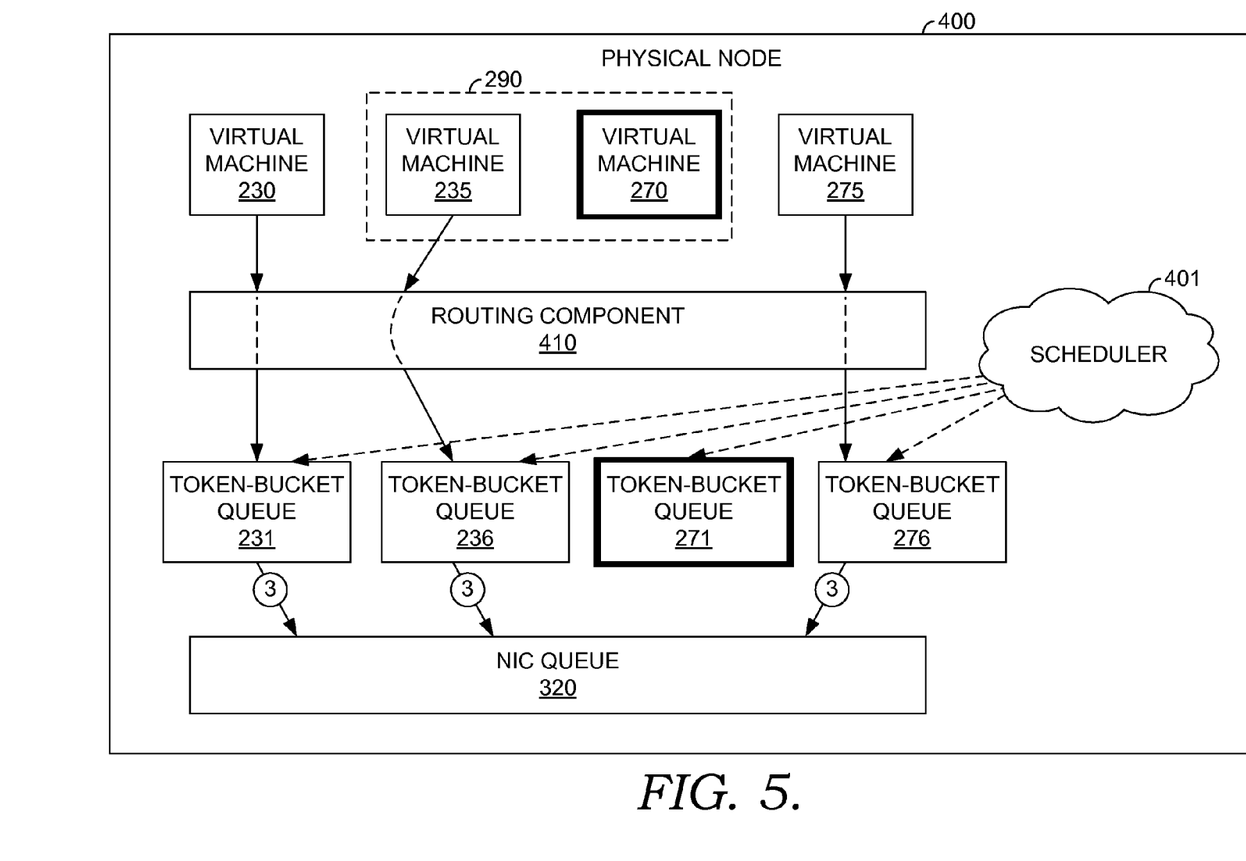
Figure 6:
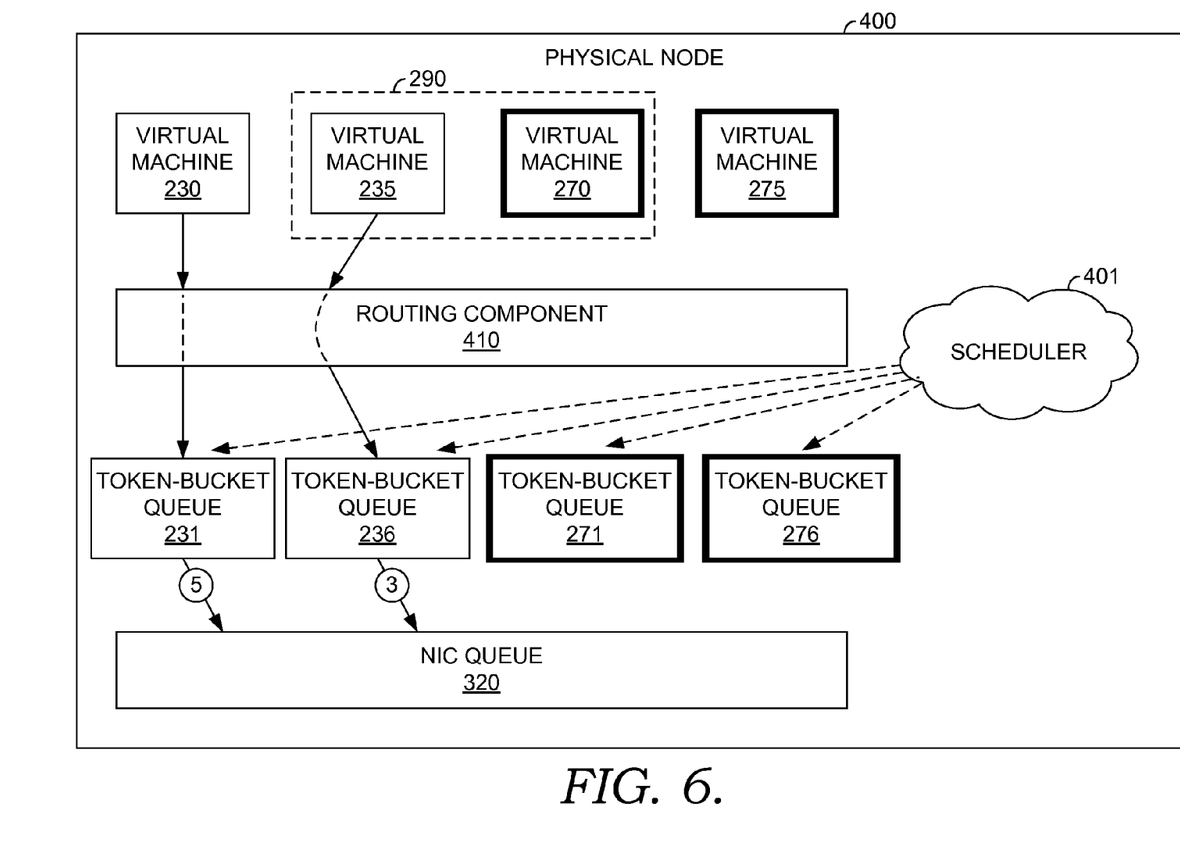

In one aspect, embodiments of the present invention relate to one or more computer-readable media having computer-executable instructions embodied thereon that, when executed, perform a method for metering various data flows of packets originating from a plurality of VMs instantiated on the single physical node. Initially, the method includes the step of inspecting one or more quality of service (QoS) policies written to a contract. Typically, the contract governs allocation of network resources to a client. Next, tokens may be deposited into a token-bucket queue based, in part, on the one or more QoS policies of the client contract. As shown in FIGS. 4-6, the token-bucket queue is assigned to the VM instantiated on the physical node. The VM may be identified as having assumed an active state based on a depletion of the deposited tokens from the token-bucket queue. (When in the active state, a portion of the deposited tokens are withdrawn from the token-bucket queue as a function of a rate of the data flow from the VM.) The method may further include the step of reloading tokens into the token-bucket queue based, in part, on (a) the QoS policies and/or (b) a portion of the deposited tokens remaining in the token-bucket queue.

In another aspect, embodiments of the present invention relate to a computer system capable of metering a rate at which packets from a VM are injected into a network utilizing one or more policies specified by tenants of a data center. The computer system includes computer storage medium that has computer software components embodied thereon. The computer software components include the following: a first VM, a second VM, a first token-bucket queue, a second token-bucket queue, and a scheduler. The first and second VMs are instantiated on the same physical node. The first token-bucket queue is assigned to the first VM, while the second token-bucket queue is assigned to the second VM. As used herein, the first token-bucket queue and the second token-bucket queue generally represent distinct memory buffers located on the physical node.

The scheduler is configured to read a first-client contract and a second-client contract associated with the first VM and the second VM, respectively. The scheduler is further able to deposit a first amount of tokens into the first token-bucket queue as a function of policies written to the first-client contract. Similarly, the scheduler may deposit a second amount of tokens into the second token-bucket queue as a function of the policies within the second-client contract. As used herein, the first amount of tokens and the second amount of tokens each generally represent a portion of network bandwidth that is allocated to the first VM and the second VM, respectively. Often, the first amount and the second amount of tokens differ in value based on a discrepancy in network bandwidth allocation between the first and second VM.

In yet another aspect, embodiments of the present invention relate to a computerized method for imposing a limit on a rate of data flowing from a subject VM. In one embodiment, the method involves accepting a first deposit of tokens from a scheduler. Typically, an amount of tokens provided within the first deposit is based on, at least one of, the following: tokens currently maintained within a token-bucket queue, network bandwidth allocated to the subject VM associated with the token-bucket queue, or network bandwidth allocated to other VMs located on a common physical node as the subject VM.

The method may further involve the steps of consuming the tokens according to a rate of the data flow from the subject VM, and dynamically metering the data-flow rate upon substantially depleting the tokens. In instances of the present invention, the process of metering may include either forwarding to a network interface component packets within the data flow that are received prior to the tokens being substantially depleted from the token-bucket queue, or enqueueing packets within the data flow that are received subsequent to the tokens being substantially depleted from the token-bucket queue. Upon the token-bucket queue accepting a second deposit of tokens from the scheduler, the enqueued packets may be forwarded to the network interface component, assuming that the tokens within the second deposit is adequate in amount to distribute the packets held by the token-bucket queue.

Having briefly described an overview of embodiments of the present invention, an exemplary operating environment suitable for implementing embodiments of the present invention is described below. In particular, an exemplary operating environment supports functionality of a mechanism that allows VMs residing on a common physical node to fairly share network bandwidth by placing restrictions on resource consumption; thus, ameliorating overly depleting the network bandwidth or adversely affecting the quality of service that is guaranteed to the VMs via service contracts.

Figure 1:
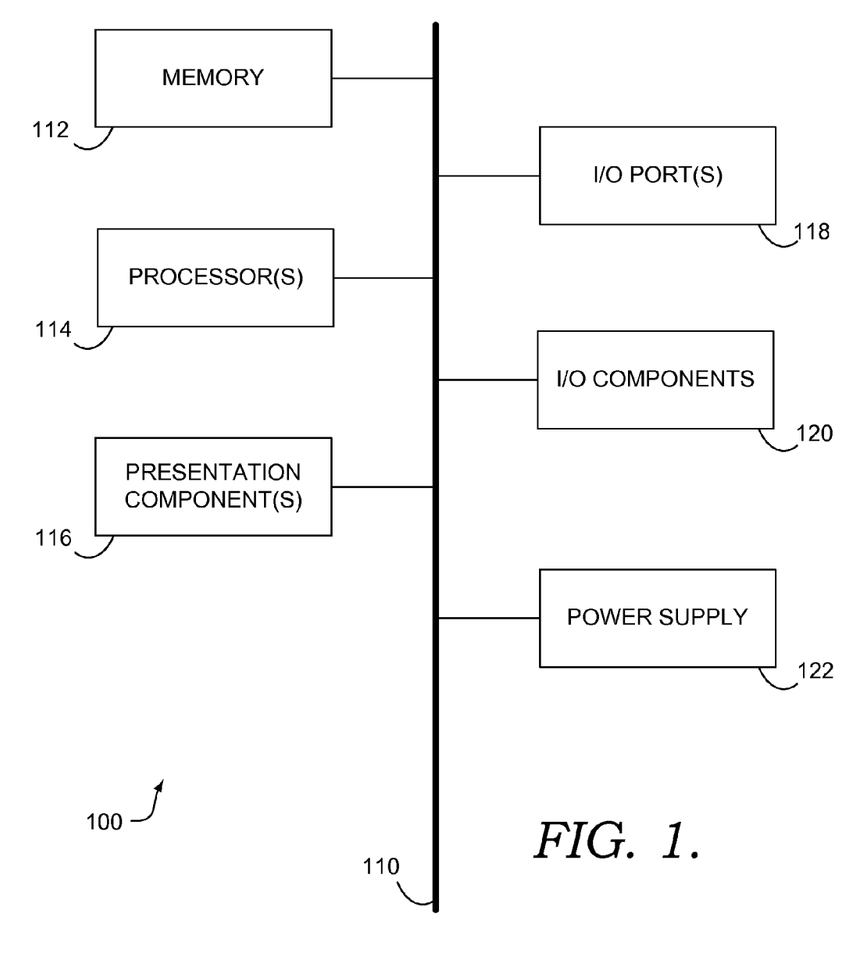
FIG. 1 is a block diagram of an exemplary computing environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing environment 100 be interpreted as having any dependency or requirement relating to any one or combination of components illustrated.

Embodiments of the present invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like refer to code that performs particular tasks, or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built-in. Illustrative components include a microphone, joystick, game pad, satellite dish, scanner, printer, wireless device, etc.

Figure 2:
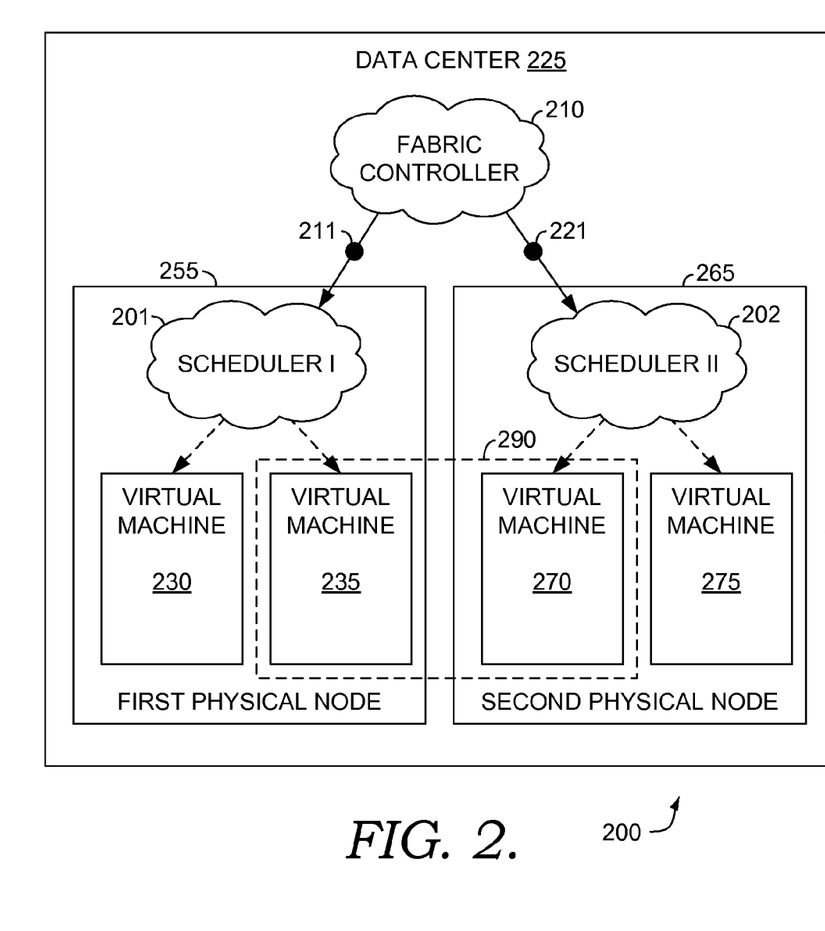
FIG. 2 is a block diagram illustrating an exemplary cloud computing platform, suitable for use in implementing embodiments of the present invention, that is configured to allocate bandwidth within a physical node of a data center.

With reference to FIGS. 1 and 2, a first physical node 255 and/or second physical node 265 may be implemented by the exemplary computing device 100 of FIG. 1. Further, one or more of the virtual machines 230, 235, 270, and/or 275 may include portions of the memory 112 of FIG. 1 and/or portions of the processors 114 of FIG. 1. Similarly, the token-bucket queues 231, 236, 271, and/or 276 of FIGS. 4-6 may include portions of the memory 112 of FIG. 1 and/or portions of the processors 114 of FIG. 1

Turning now to FIG. 2, a block diagram is illustrated, in accordance with an embodiment of the present invention, showing an exemplary cloud computing platform 200 that is configured to allocate network bandwidth to the virtual machines 230, 235, 270 and 271 within a data center 225 for use by various service applications. By way of example, service application 290 includes virtual machines 235 and 270 that are instantiated on physical nodes 255 and 256, respectively, to support functionality of the service application 290. It will be understood and appreciated that the cloud computing platform 200 shown in FIG. 2 is merely an example of one suitable computing system environment and is not intended to suggest any limitation as to the scope of use or functionality of embodiments of the present invention. For instance, the cloud computing platform 200 may be a public cloud, a private cloud, or a dedicated cloud. Neither should the cloud computing platform 200 be interpreted as having any dependency or requirement related to any single component or combination of components illustrated therein. Further, although the various blocks of FIG. 2 are shown with lines for the sake of clarity, in reality, delineating various components is not so clear, and metaphorically, the lines would more accurately be grey and fuzzy. In addition, any number of physical machines, virtual machines, data centers, endpoints, or combinations thereof may be employed to achieve the desired functionality within the scope of embodiments of the present invention.

The cloud computing platform 200 includes the data center 225 configured to host and support operation of the virtual machines 230, 235, 270, and 271, or endpoints, of service applications (e.g., service application 290) owned by tenants/customers of the data center 225. The phrase "service application," as used herein, broadly refers to any software, or portions of software, that runs on top of, or accesses storage locations within, the data center 225. In one embodiment, one or more of the virtual machines 230, 235, 270, and 271 may represent the portions of software, component programs, or instances of roles that participate in the service application. In another embodiment, one or more of the virtual machines 230, 235, 270, and 271 may represent stored data that is accessible to a service application. It will be understood and appreciated that the virtual machines 230, 235, 270, and 271 shown in FIG. 2 are merely an example of suitable parts to support a service application and are not intended to suggest any limitation as to the scope of use or functionality of embodiments of the present invention.

Generally, virtual machines 230, 235, 270, and 271 are instantiated and designated to a service application based on demands (e.g., amount of processing load) placed on the service application. As used herein, the phrase "virtual machine" is not meant to be limiting, and may refer to any software, application, operating system, or program that is executed by a processing unit to underlie the functionality of the service application. Further, the virtual machines 230, 235, 270, and 271 may include processing capacity, storage locations, and other assets within the data center 225 to properly support the service applications.

In operation, the virtual machines 230, 235, 270, and 271 are dynamically allocated resources (e.g., network bandwidth of a network interface card) of the physical nodes 255 and 265 to satisfy a current processing load while meeting QoS policies 211 and 221 of a client contracts. In one instance, a fabric controller 210 is responsible for automatically pushing down these QoS policies 211 and 221 to schedulers 201 and 202, respectively. By way of example, the fabric controller 210 may rely on a service model (e.g., designed by a customer that owns the service application) to provide guidance on how and when to allocate resources, such as processing capacity, to the virtual machines 230, 235, 270, and 271. In another example, the fabric controller 210 may be configured to parse service-level agreements (SLAs) to identify which guarantees are provided to which customers and to which components running the customer's service application. These guarantees may be delivered to the schedulers 201 and 202 in the form of the QoS policies 211 and 221. In operation, the schedulers 201 and 202 enforce the QoS policies 211 and 221 via the token-bucket queues (discussed below).

As used herein, the term "scheduler" is not meant to be limiting, but may encompass any mechanism that promotes network-bandwidth management by receiving instructions from a centralized utility (e.g., fabric controller 210) and enforcing QoS policies within the instructions. In an exemplary embodiment, the schedulers 201 and 202 may monitor data flows originating from each of the VMs on the physical nodes 255 and 265, and compare the data flows against the QoS policies to arrive upon an appropriate amount of network bandwidth to allocate to the virtual machines 230, 235, 270, and 271. In the field of computer networking (e.g., packet-switched telecommunication networks), the traffic engineering phrase "QoS policies" refers to a blueprint for implementing resource reservation and distribution amongst VMs. Generally, "quality of service" (QoS) refers to the ability to provide different priority to different service applications, components of applications (e.g., VMs), users, or data flows, in order to guarantee a certain level of performance thereto. For example, a fixed bit rate may be guaranteed for a particular VM in a particular context. As such, the guarantees of the QoS policies 211 and 221 are advantageously utilized as guidelines for scheduling resources to users, who share the same network resources within a limited-capacity physical node.

As discussed above, one or more VMs may be dynamically allocated resources within the first physical node 255 and the second physical node 265. Per embodiments of the present invention, the physical nodes 255 and 265 may represent any form of computing devices, such as, for example, a personal computer, a desktop computer, a laptop computer, a mobile device, a consumer electronic device, server(s), the computing device 100 of FIG. 1, and the like. In one instance, the physical nodes 255 and 265 host and support the operations of the virtual machines 230, 235, 270, and 275, respectively, while simultaneously hosting other virtual machines (not shown) carved out for supporting other tenants of the data center 225, where the tenants include endpoints of other service applications owned by different customers.

Figure 3:
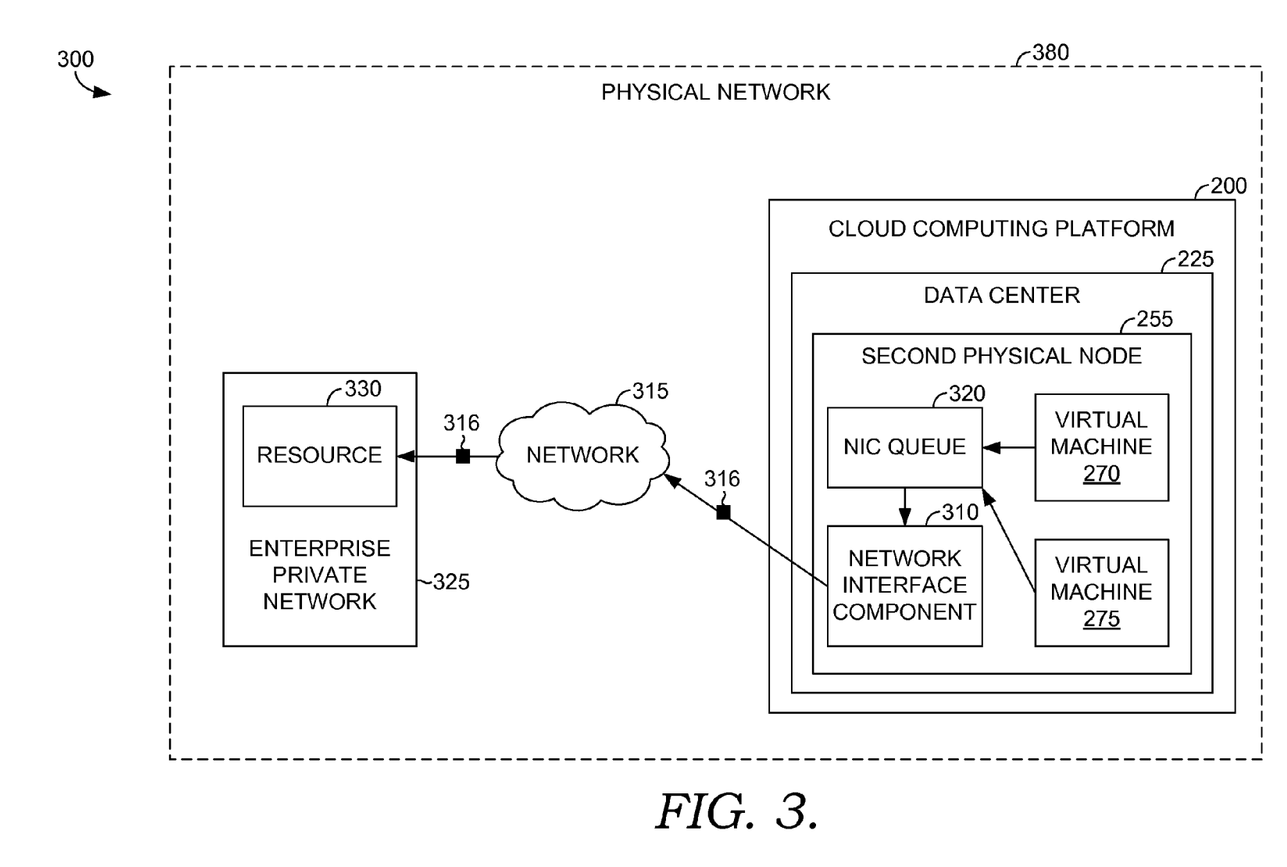
FIG. 3 is block diagram of an exemplary distributed computing environment depicting components within a physical node communicating to an external endpoint, in accordance with an embodiment of the present invention.

In one aspect, the VMs operate within the context of the cloud computing platform 200 and, accordingly, may communicate internally within a physical node, communicate across physical nodes 255 and 265 through connections dynamically made that traverse the data center 225, and externally through a physical network topology to resources of a remote network (e.g., in FIG. 3 resource 375 of the enterprise private network 325). The connections may involve interconnecting the VMs distributed across physical resources of the data center 225 via a network cloud (not shown). The network cloud interconnects these resources such that one VM may recognize a location of another VM in order to establish a communication therebetween. For instance, the network cloud may establish this communication over channels connecting the VMs 235 and 270 of the service application 290. By way of example, the channels may include, without limitation, one or more local area networks (LANs) and/or wide area networks (WANs). Such networking environments are commonplace in offices, enterprise-wide computer networks, intranets, and the Internet. Accordingly, the network is not further described herein.

Turning now to FIG. 3, block diagram illustrating an exemplary distributed computing environment 300 with two VMs 270 and 275 established therein is shown in accordance with an embodiment of the present invention. Initially, the distributed computing environment 300 includes a physical network 380 that includes an enterprise private network 325 and the cloud computing platform 200, as discussed with reference to FIG. 2. As used herein, the phrase "physical network" is not meant to be limiting, but may encompass tangible mechanisms and equipment (e.g., fiber lines, circuit boxes, switches, antennas, IP routers, and the like), as well as intangible communications and carrier waves, that facilitate communication between endpoints at geographically remote locations. By way of example, the physical network 380 may include any wired or wireless technology utilized within the Internet, or available for promoting communication between disparate networks.

Generally, customers of the data center 255 often require service applications running on resources therein to interact with the software being run at another location, such as the private enterprise network 325. As used herein, the phrase "private enterprise network" generally refers to a server managed by a customer, or client of the cloud computing platform 200, that is geographically remote from the data center 225. In the embodiment illustrated in FIG. 3, the enterprise private network 325 includes resources, such as resource 330, that are managed by the client of the cloud computing platform 200. Often, these resources host and support operations of components of the service application owned by the customer.

As depicted by reference numeral 315, a network is established within the physical network 380. Typically, the network 315 is established to transport packets between endpoints. By way of example, the network 315 acts to convey packets 316 between the VMs 270 and 275 instantiated on the second physical node 255 and the resource 330. In operation, both the VMs 270 and 275 may originate data flows that include packets. These data flows may be intercepted by a network interface controller (NIC) queue that meters a first data flow from the virtual machine 270 in conjunction with a second data flow from the virtual machine 275. Generally, the NIC queue 320 functions as an internal filter, which controllably forwards the packets of the first and second data flows to a network interface component 310.

Upon passing the metered data flow to the network interface component 310, which may be configured as a network adapter or network interface card, the network interface component 310 releases the packets 316 of the data flows into the network 315. Stated differently, the network interface component 310 receives the metered first data flow and the metered second data flow from the NIC queue 320 and releases from the second physical node 255 a controlled volume of traffic comprising the packets 316 within the metered first and second data flows. In other embodiments (not shown), virtualized implementations of the network interface controller (VNICs) may be set up within the virtual machines 270 and 275 themselves to self-regulate a rate of outgoing packets.

As mentioned above, the network 315 and is limited by its available network bandwidth while the second physical node 255 is configured with a particular amount of resources (e.g., limited processing capacity of the network interface component 310). Accordingly, if no additional mechanisms to fairly distribute the network bandwidth and/or resources are put in place, the VMs 270 and 275 may compete for the network bandwidth and/or resources without consideration of pre-defined QoS policies. For instance, once a connection over the network 315 is established, the virtual machine 270 may attempt consume all the network bandwidth independent of other usage, thus, degrading performance of the virtual machine 275, which is also attempting to send packet(s) to an endpoint. As such, exemplary embodiments of the present invention introduce token-bucket queues assigned to each VM that meter a rate at which packets from the VMs are injected into the network 315 utilizing the QoS policies specified by tenants of the data center 225. These token-bucket queues are described immediately below with reference to FIGS. 4-7.

Typically, the resource 330 and the data center 225 include, or are linked to, some form of a computing unit (e.g., central processing unit, microprocessor, etc.) to support operations of the VM(s) 270 and 275, and/or component(s), running thereon. As utilized herein, the phrase "computing unit" generally refers to a dedicated computing device with processing power and storage memory, which supports one or more operating systems or other underlying software. In one instance, the computing unit is configured with tangible hardware elements, or machines, that are integral, or operably coupled, to the resource 330 and the data center 225 to enable each device to perform a variety of processes and operations. In another instance, the computing unit may encompass a processor (not shown) coupled to the computer-readable medium accommodated by each of the resource 330 and the data center 225. Generally, the computer-readable medium stores, at least temporarily, a plurality of computer software components (e.g., the VMs 270 and 275) that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

Turning now to FIG. 4, a block diagram is shown depicting various data flows between VMs 230, 235, 270, and 275 and corresponding token-bucket queues 231, 236, 271, and 276, respectively, in accordance with an embodiment of the present invention. Initially, this plurality of VMs each reside on a single physical node 400. Accordingly, the VMs 230, 235, 270, and 275 are obliged to fairly share network resources, such as a network link/connection or the bandwidth provisioned thereto.

A routing component 410 is provided that knows a mapping between the VMs 230, 235, 270, and 275 and their assigned token-bucket queues 231, 236, 271, and 276, respectively. In operation the routing component 410 is configured to access the mapping upon detecting one or more VMs attempting to transmit a data flow to an endpoint external to the physical node 400, and to route the data flow to the one or more token-bucket queues based on the mapping. By way of example, the routing component 410 may capture a data flow, identify a source of the data flow as the virtual machine 230, and utilize the mapping to the determine that the data flow should be passed to the token-bucket queue 231, which is assigned to the virtual machine 230.

The above described embodiment typically applies when a packets within the data flow are addressed to a destination outside the physical node 400. If the packets within the data flow are addressed to a destination internal to the physical node 400, the routing component 410 may directly route the packets to the targeted VM. By way of example, if the VM 230 is attempting to communicate packets to the VM 235, the routing component 410 may convey the packets to the VM 235 without passing through the token-bucket queue 231 assigned to the VM 230, thereby bypassing and precluding engagement of the token-bucket queue 231. This is due to the lack of network-bandwidth consumption when internally transmitting packets.

A scheduler 401 is provided on the physical node 400. Generally, the scheduler 401 represents local VM management software that dynamically allocates network bandwidth to the VMs 230, 235, 270, and 275 based on a variety of criteria. In embodiments, schedulers are instantiated on physical nodes by way of a one-to-one relationship. As mentioned above, the scheduler 401 maintains QoS policies 211, 212, and 213 that are pushed down from a fabric controller (not shown) that maintains prevailing client, or subscriber, contracts containing the QoS policies 211, 212, and 213. In addition to the QoS policies 211, 212, and 213, other information (e.g., changes to QoS policies) may migrate from the fabric controller to the scheduler 401 are various periods of time (e.g., regular intervals or upon receiving an update). In one instance, updates to the client contracts may be made via a user-mode API that allows an administrator to specify the QoS policies for the VMs 230, 235, 270, and 275. By way of example, a value of relative weighting or absolute bandwidth may be entered at the user-mode API. The "relative weighting" and the "absolute bandwidth" are variables used in independent, mutually-exclusive schemes for allocating network bandwidth, which are discussed in more detail below.

In operation, the scheduler 401 is capable of inspecting the QoS policies 211, 212, and 213 written to one or more clients' contracts. As discussed above, the client contracts govern allocation of network resources to the VMs 230, 235, 270, and 275. (Because VM 235 and VM 270 are components of a common service application (see reference numeral 290 of FIG. 2), the QoS policies 212 govern distribution of network bandwidth to both the VMs 235 and 270.) Upon inspection of the inspecting the QoS policies 211, 212, and 213, the scheduler 401 may deposit tokens into the token-bucket queues 231, 236, 271, and 276 based, in part, on the QoS policies 211, 212, and 213. As used herein, the term "tokens" is not meant to be restrictive, and con encompass any representations of a portion of network bandwidth that is allocated to one or more VMs.

Figure 7:
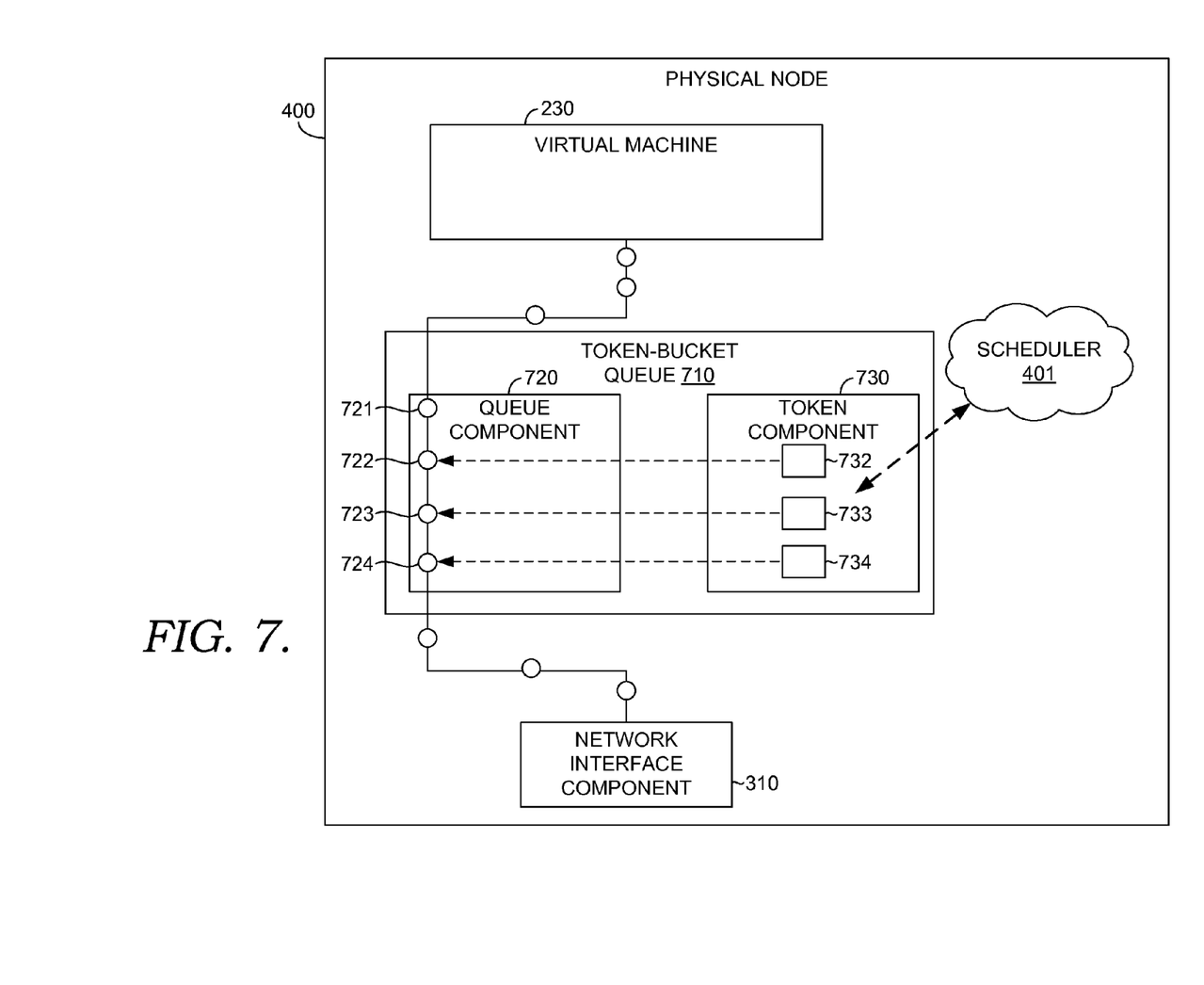
FIG. 7 is a block diagram of a token-bucket queue that is metering a data flow based on tokens deposited therein, in accordance with embodiments of the present invention.
Figure 9:
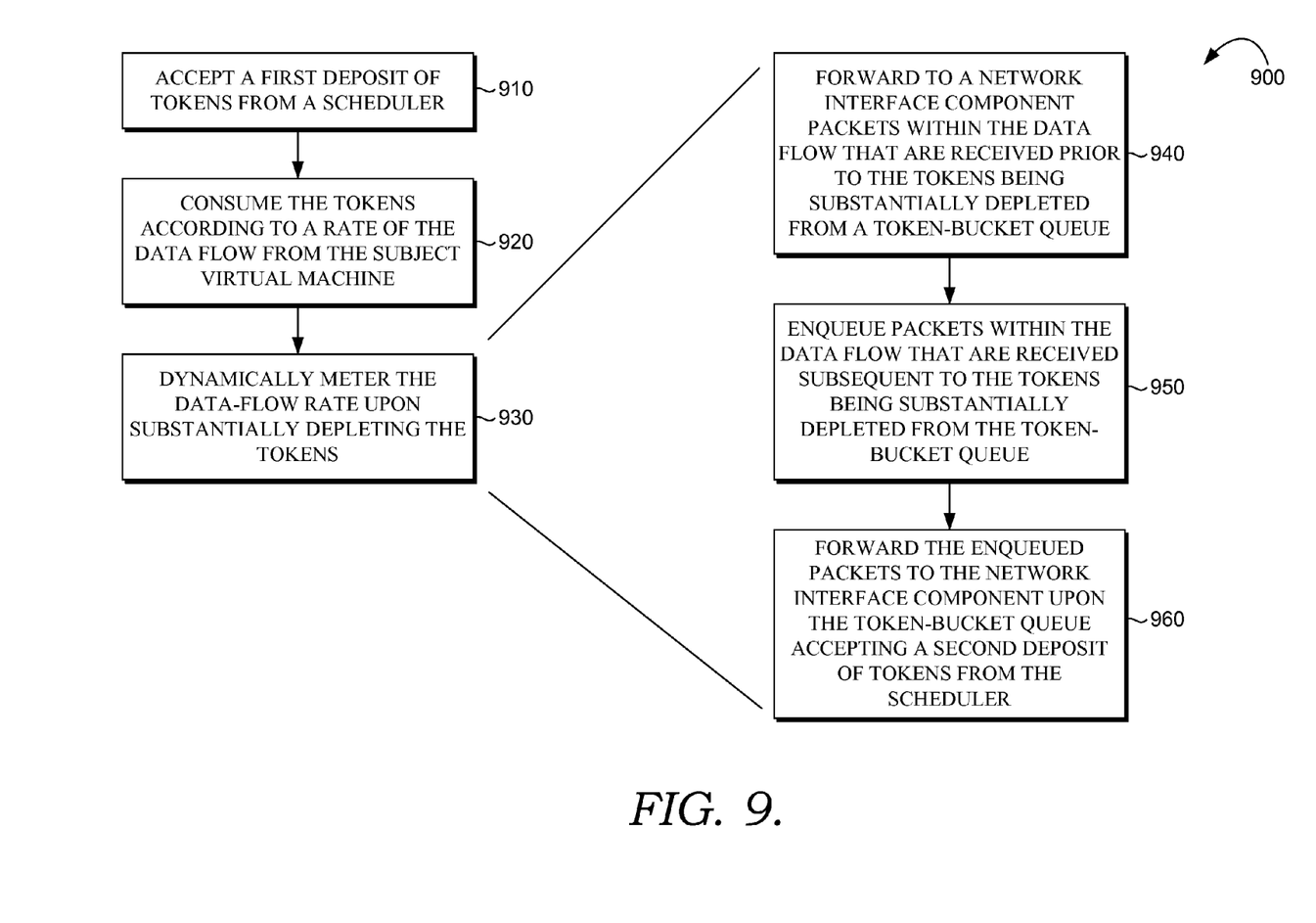
FIG. 9 is a flow diagram showing an exemplary method for imposing a limit on a rate of data flowing from a subject VM, in accordance with an embodiment of the present invention.

The token-bucket queues 231, 236, 271, and 276 are provided to impose a limit on a rate of data flowing from their corresponding VMs 230, 235, 270, and 275, respectively, as a function of the deposited tokens. The process of imposing a limit of the data-flow rate will now be discussed with reference to FIGS. 7 and 9. FIG. 9 shows a flow diagram depicting an exemplary method 900 for limiting a data-flow rate, while FIG. 7 shows a block diagram of a token-bucket queue 710 for metering a data flow based on tokens 732, 733, and 734 deposited therein. Initially, the method 900 involves accepting a first deposit of tokens (e.g., tokens 732, 733, and 734) from the scheduler 401, as indicated at block 910. Typically, the amount of tokens provided within the first deposit is based on, at least one of, the following: the tokens 732, 733, and 734 currently maintained within a token-bucket queue 710, network bandwidth allocated to the subject VM 230 associated with the token-bucket queue 710, or network bandwidth allocated to other VMs located on a common physical node 400 as the subject VM 230.

The method 900 may further involve the steps of consuming the tokens 732, 733, and 734 according to a rate of the data flow from the subject VM 230 (see block 920), and dynamically metering the data-flow rate upon substantially depleting the tokens 732, 733, and 734 (see block 930). In instances of the present invention, the process of metering may include either forwarding to the network interface component 310 packets within the data flow that are received prior to the tokens 732, 733, and 734 being substantially depleted from the token-bucket queue 710, as indicated by block 640 Or, when the tokens 732, 733, and 734 have been substantially depleted from the token-bucket queue 710, the subsequent packets within the data flow may be enqueued, as indicated by block 650.

By way of example, the token-bucket queue 710 may include a token component 730 that periodically receives an amount of tokens (e.g., tokens 732, 733, and 734) deposited thereto by the scheduler 401, and consumes them according to a rate of the data flow from the VM 230. Specifically, as shown in FIG. 7, when the VM 230 transmits the data flow to the token-bucket queue 710, a prescribed amount of tokens 732, 733, and 734 are deducted from the token component 730 prior to releasing the packets 722, 723, and 724 from the queue component 720. The queue component 720 serves to internally enqueue packets that are received by the token-bucket queue 710 when the token component 730 maintains an insufficient quantity of tokens for consumption. As illustrated, packet 721 does not have a corresponding token upon the packets 722, 723, and 724 consuming the currently deposited packages 732, 733, and 734. Accordingly, the queue component 720 will preclude the release of the packet 721 until such time that sufficient tokens are reloaded into the token component 730.

Upon the token component 730 of the token-bucket queue 710 accepting another deposit of tokens from the scheduler 401, the enqueued packet 721 may be released from the queue component 720. In addition, the packet 721 may be forwarded to the network interface component 310, assuming that the tokens within the subsequent deposit are adequate in amount to distribute the packet 721 held by the token-bucket queue 710. This procedure is indicated within the method 900 at block 960.

Turning to FIGS. 4-6, the schemes pertaining to absolute bandwidth and relative weighting will now be discussed. Initially, the "absolute-bandwidth scheme" for distributing network resources involves allocating a particular amount of tokens to a VM regardless of the network resources presently being utilized by other VMs occupying the same physical node. For instance, if the physical node 400 has 10 MBs of available network resources, the VM 270 may be allocated 4 MBs as an absolute value. As discussed above, allocation of 4 MBs may involve depositing tokens into the token-bucket queue 271 that is equivalent to 4 MBs. If one of the other VMs 230, 235, or 275 assumes an idle state (ceasing to use network resources), the VM 270 will continue to be allocated the consistent 4 MBs of network resources.

In other embodiments, the "relative-weighting scheme" for distributing network resources involves allocating an amount of tokens to a VM that is relative to the network resources presently being utilized by other VMs occupying the same physical node. For instance, referring to FIG. 5, if the physical node 400 has 10 MBs of available network resources, the VM 275 may be allocated 3 MBs as a relative value, where the weighting is 1/3 of available bandwidth. As shown, the remaining active VMs 230 and 235 are also provided with a weighting of 1/3 (i.e., predefined ratio) of available bandwidth. The allocation of the relative value of 3 MBs involves depositing tokens into the token-bucket queues 231, 236, and 276 that is equivalent to 3 MBs for each.

As depicted, the VM 270 has assumed an idle state (ceasing to use network resources). Thus, according to the relative-weighting scheme, the network resources initially allocated to the VM 270 are divided amongst the VMs 230, 235, and 237 in the active state. However, in embodiments, the QoS policies may reserve a particular amount of bandwidth for VMs within the idle state. This reserved bandwidth cannot be allocated to VMs in the active state. In the scenario depicted in FIG. 5, 1 MB is reserved for VM 270; thus, the allocated network resources can only combine to be 9 MB. It should be noted that, when setting the QoS policies, the total reserve for all VMs on the physical node 400 cannot be greater than the available bandwidth provisioned thereto.

When distributing the tokens, the scheduler 401 may be periodically invoked (e.g., 20 ms), or dynamically triggered upon the occurrence of an event, to reload the token-bucket queues assigned to the VMs that remain in the active condition. The scheduler 401 may detect those VMs that have assumed the idle condition based on the unused tokens residing in their assigned token-bucket queues. As such, the scheduler 401 may abstain from reloading the token-bucket queues of the VMs in the idle state, but may reserve tokens based on their QoS policies, as discussed above.

Further, the scheduler 401 may cap the network resources, or amount of tokens, that may be allocated to a particular VM based on the instructions of the QoS policies. For instance, with reference to FIG. 6, VM 235, although it is granted a relative value of 1/3 of available bandwidth, is capped at 3 MB. Thus, in operation, the cap provides the maximum amount of network resources a data flow can consume, even when a portion of the available bandwidth remains unallocated (e.g., due to idling VMs).

Figure 8:
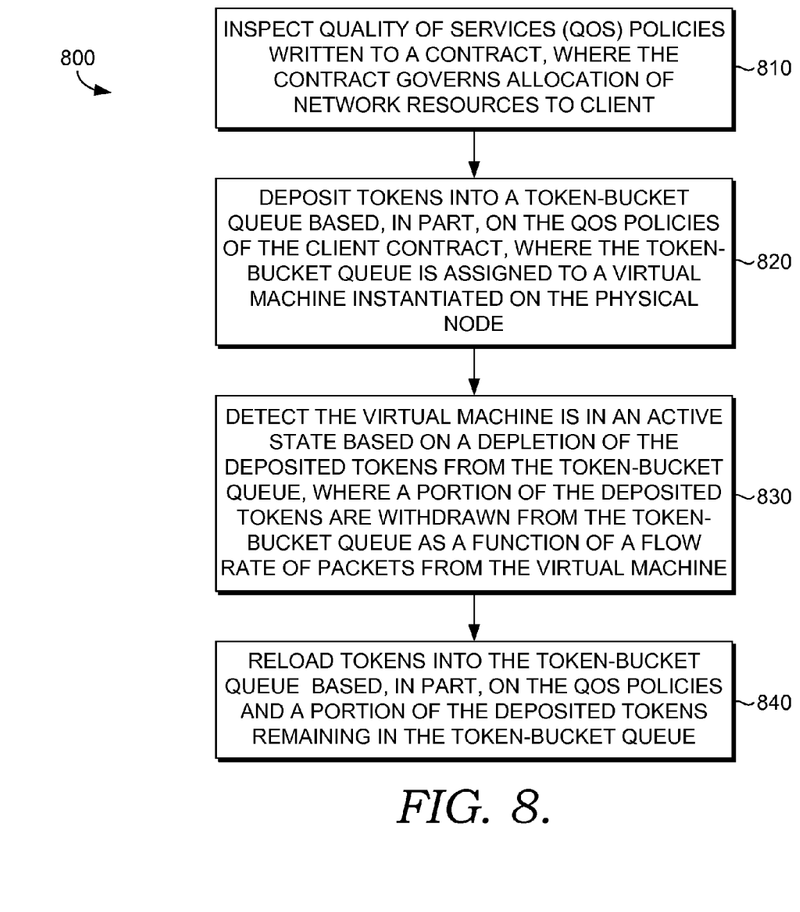
FIG. 8 is a flow diagram showing an exemplary method for metering various data flows of packets originating from a plurality of VMs instantiated on the single physical node, in accordance with an embodiment of the present invention.

Turning now to FIG. 8 is a flow diagram is illustrated that shows an exemplary method 800 for metering various data flows of packets originating from a plurality of VMs instantiated on the single physical node, in accordance with an embodiment of the present invention. Initially, the method 800 includes the step of inspecting one or more QoS policies written to a contract, as indicated at block 810. Typically, the contract governs allocation of network resources to a client. Next, tokens may be deposited into a token-bucket queue based, in part, on the QoS policies of the client contract, as indicated at block 820. As shown in FIGS. 4-6, the token-bucket queue is assigned to the VM instantiated on the physical node. The VM may be identified as having assumed an active state based on a depletion of the deposited tokens from the token-bucket queue, as indicated at block 830. (When in the active state, a portion of the deposited tokens are withdrawn from the token-bucket queue as a function of a rate of the data flow from the VM.) The method 900 may further include the step of reloading tokens into the token-bucket queue as a function of the QoS policies, a portion of the deposited tokens remaining in the token-bucket queue, or other criteria, as indicated at block 840.

Embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-storage memory having computer-executable instructions embodied thereon that, when executed, perform a method for metering various data flows of packets originating from a plurality of virtual machines (VMs) instantiated on a single physical node, the method comprising:
   inspecting one or more quality of service (QoS) policies written to a contract, wherein the contract governs allocation of network resources to a first client;
   depositing tokens into a first token-bucket queue based, in part, on the one or more QoS policies of the first-client contract, wherein the first token-bucket queue is assigned to a first VM instantiated on the physical node;
   detecting the first VM is in an active state based on a depletion of the deposited tokens from the first token-bucket queue, wherein a portion of the deposited tokens are withdrawn from the first token-bucket queue as a function of a rate of the data flow from the first VM;
   reloading tokens into the first token-bucket queue based, in part, on the one or more QoS policies and a portion of the deposited tokens remaining in the first token-bucket queue
   detecting the first VM is in an idle state based on a lack of usage of the deposited tokens from the first token-bucket queue, wherein the deposited tokens are not withdrawn from the first token-bucket queue when the first VM ceases transmitting packets therefrom; and
   abstaining from reloading tokens into the first token-bucket queue based, in part, on the idle state of the first VM, wherein inspecting one or more QoS policies written to a contract comprises determining a minimal amount of tokens to reserve for the first token-bucket queue when the first VM has assumed the idle state.

2. The one or more computer-storage memory of claim 1, the method further comprising:
   inspecting one or more QoS policies written to a second-client contract that governs allocation of network resources to a second VM instantiated on the physical node; and
   depositing tokens into a second token-bucket queue based, in part, on the one or more QoS policies of the second-client contract, wherein the second token-bucket queue is assigned to the second VM.

3. The one or more computer-storage memory of claim 2, wherein depositing tokens into a first token-bucket queue comprises depositing a first amount of tokens into the first token-bucket queue, wherein depositing tokens into a second token-bucket queue comprises depositing a second amount of tokens into the second token-bucket queue, and wherein the first amount and the second amount of tokens differ in value.

4. The one or more computer-storage memory of claim 2, wherein the first amount is an absolute value of network bandwidth that is allocated to the first VM as specified by the first-client contract.

5. The one or more computer-storage memory of claim 3, wherein the first amount is based upon a first weighting associated with the first VM relative to, at least, a second weighting associated with the second VM, and wherein first weighting and the second weighting are specified by the first-client contract and the second client contract, respectively.

6. The one or more computer-storage memory of claim 3, the method further comprising:
   identifying network bandwidth currently available at a network interface component, wherein the network interface component functions to control a volume of traffic from the physical node to a network; and
   utilizing the available network bandwidth to determine the first amount of tokens to be deposited into the first token-bucket queue.

7. The one or more computer-storage memory of claim 6, the method further comprising:
   utilizing the one or more QoS policies written to the first-client to determine a maximum amount of tokens to deposit into the first token-bucket queue; and
   capping the rate of data flow from the first VM upon the first token-bucket queue withdrawing the maximum amount of tokens.

8. The one or more computer-storage memory of claim 7, wherein the maximum amount of tokens is deposited into the first token-bucket queue when the first VM has assumed an active state and sufficient network bandwidth is identified as being currently available at the network interface component.

9. A computer system capable of metering a rate at which packets from a virtual machine are injected into a network utilizing one or more policies specified by tenants of a data center, the computer system comprising a computer storage medium having a plurality of computer software components embodied thereon, the computer software components comprising:
   a first VM instantiated on a physical node;
   a second VM instantiated on the physical node;
   a first token-bucket queue assigned to the first VM;
   a second token-bucket queue assigned to the second VM, wherein the first token-bucket queue and the second token-bucket queue represent distinct memory buffers located on the physical node; and
   a scheduler that reads a first-client contract and a second-client contract associated with the first VM and the second VM, respectively, that deposits a first amount of tokens into the first token-bucket queue as a function of the one or more policies within the first-client contract, and that deposits a second amount of tokens into the second token-bucket queue as a function of the one or more policies within the second-client contract,
   wherein the first amount of tokens and the second amount of tokens each represent a portion of network bandwidth that is allocated to the first VM and the second VM, respectively,
   wherein the first amount and the second amount of tokens differ in value,
   wherein the first VM transmits a first data flow of packets to the first token-bucket queue prior to the packets of the first data flow being released from the physical node,
   wherein the second VM transmits a second data flow of packets to the second token-bucket queue prior to the packets of the second data flow being released from the physical node,
   wherein, upon receiving the first data flow, the first token-bucket queue deducts a prescribed amount of tokens deposited therein for each packet within the first data flow, wherein, upon receiving the second data flow, the second token-bucket queue deducts a prescribed amount of tokens deposited therein for each packet within the second data flow; and a routing component that accesses a mapping between the first VM and the first token-bucket queue when the first VM is attempting to transmit the first data flow to an endpoint external to the physical node, and that routes the first data flow to the first token-bucket queue based on the mapping, wherein the routing component routes the first data flow from first VM to the second VM without passing through the first token-bucket queue when the first VM is attempting to transmit the first data flow directly to the second VM.

10. The computer system of claim 9, the computer software components further comprising a network interface controller (NIC) queue that meters the first data flow from the first token-bucket queue in conjunction with the second data flow from the second token-bucket queue.

11. The computer system of claim 10, the computer software components further comprising a network interface component that receives the metered first data flow and the metered second data flow from the NIC queue and releases from the physical node a controlled volume of traffic comprising the packets within the metered first data flow and the metered second data flow.

12. The computer system of claim 9, wherein the first token-bucket queue includes a token component that periodically receives the deposited first amount of tokens and consumes the tokens maintained therein according to a rate of the first data flow.

13. The computer system of claim 12, wherein the first token-bucket queue includes a queue component that internally enqueues packets transmitted within the first data flow that are received thereby when the token component maintains an insufficient quantity of tokens for consumption.

14. A computerized method for imposing a limit on a rate of data flowing from a subject virtual machine (VM), the method comprising:

accepting a first deposit of tokens from a scheduler, wherein an amount of tokens provided within the first deposit is based on determining whether the subject VM is in an active state, based on a depletion of the first deposit of tokens, or an idle state, based on a lack of usage of the first deposit of tokens, wherein, when in the active state, a token-bucket queue of the subject VM is reloaded as a function of a portion of the first deposit of tokens remaining in the first token-bucket queue, and wherein, when in the idle state, the token-bucket queue is reloaded with a minimal amount of tokens reserved for the subject VM;

consuming the tokens according to a rate of the data flow from the subject VM; and dynamically metering the data-flow rate upon substantially depleting the tokens, wherein metering comprises:
  (a) forwarding to a network interface component packets within the data flow that are received prior to the tokens being substantially depleted from the token-bucket queue;
  (b) enqueueing packets within the data flow that are received subsequent to the tokens being substantially depleted from the token-bucket queue; and
  (c) forwarding the enqueued packets to the network interface component upon the token-bucket queue accepting a second deposit of tokens from the scheduler.

* * * * *